United States Patent [19]

Katsuyama et al.

[11] Patent Number: 5,732,059
[45] Date of Patent: Mar. 24, 1998

[54] SYNCHRONOUS DUBBING SYSTEM AND METHOD THEREOF

[75] Inventors: Akira Katsuyama; Yasushi Matsumoto, both of Kanagawa, Japan

[73] Assignee: Sony Corporation, Tokyo, Japan

[21] Appl. No.: 790,092

[22] Filed: Jan. 29, 1997

[30] Foreign Application Priority Data

Feb. 9, 1996 [JP] Japan .................................. 8-047913

[51] Int. Cl.$^6$ ........................................................ G11B 7/00
[52] U.S. Cl. .......................... 369/84; 369/85; 369/58; 360/15
[58] Field of Search .............................. 369/84, 83, 85, 369/47, 48, 54, 58, 59, 32; 360/13, 15

[56] References Cited

U.S. PATENT DOCUMENTS

| | | | |
|---|---|---|---|
| 5,140,567 | 8/1992 | Kawabata et al. | 369/84 X |
| 5,255,250 | 10/1993 | Dewolf et al. | 369/84 X |
| 5,539,710 | 7/1996 | Tokushuku et al. | 369/32 |

*Primary Examiner*—Muhammad N. Edun
*Attorney, Agent, or Firm*—Jay H. Maioli

[57] ABSTRACT

A synchronous dubbing system for dubbing data between any one of a plurality of record units and any one of a plurality of playback units, wherein a command for causing all playback units connected from a record unit through a bus line to be released from a playback pause state is sent when the record pause state of the record unit is released in the record pause state of the record unit and in the playback pause state of the playback unit, a category code and a status of each of the playback units being sent through the bus line corresponding to the command.

8 Claims, 6 Drawing Sheets

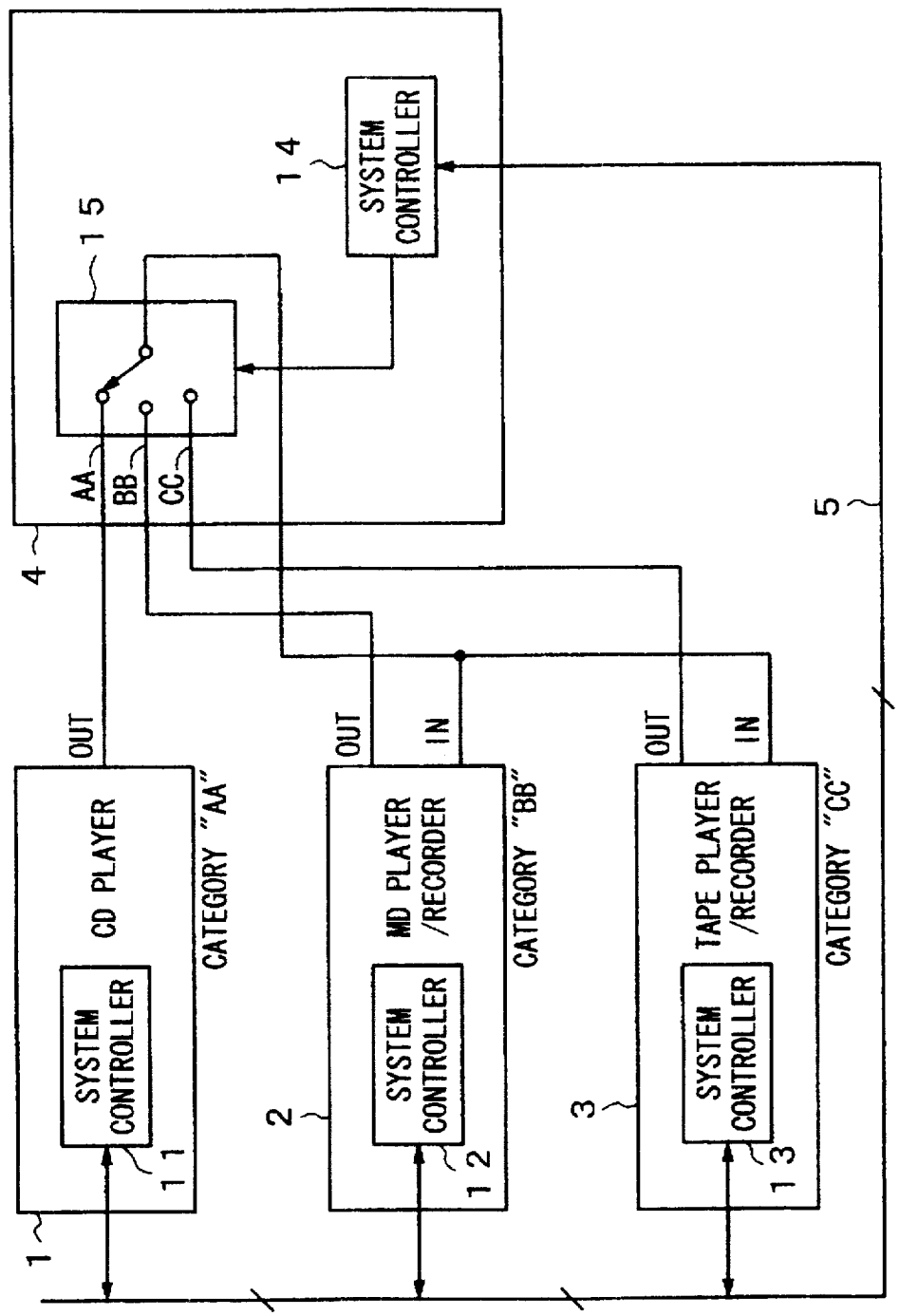

5,732,059

SYNCHRONOUS DUBBING SYSTEM AND METHOD THEREOF

BACKGROUND OF THE INVENTION

1. Field of the Invention

The present invention relates to a dubbing system for synchronously dubbing data from any playback unit to any record unit of a system composed of a plurality of audio units such as an optical disc playback unit (for example, a compact disc player), an optical-magnetic record/playback unit (for example, a Mini-Disc player/recorder), and a digital recorder/player (for example, a tape recorder and DAT: Digital Audio Tape recorder/player).

2. Description of the Related Art

A system with a so-called synchronous dubbing function is known for example, in Japanese Utility Patent Laid-Open Publication SHO 62-77491. With the synchronous dubbing function, when audio information recorded on for example a CD (Compact Disc) is dubbed to a compact cassette, a start operation, a stop operation, and so forth are automatically performed from the playback unit to the record unit. With the synchronous dubbing function, in the case that audio information recorded on a CD is dubbed to a tape, when the record operation of the cassette tape recorder is started, the CD player is automatically placed in the playback state. After the playback operation of the CD is completed, the record operation of the cassette tape recorder is automatically stopped. When the tape end of the cassette tape is detected, the playback operation of the CD player is automatically stopped. So far, such a synchronous dubbing function has been accomplished between particular units such as a CD player and a cassette tape recorder. In addition, for the synchronous dubbing function, a special operation button has been provided. To perform the synchronous dubbing function, the user should operate the dedicated operation button.

In recent years, besides analog cassette tape recorders, many types of digital audio units such as MDs (Mini Discs) and DAT (Digital Audio Tapes) have been placed on the market. With a combination of these types of audio units, users can construct their own audio systems. In such combination systems, information is dubbed among many units (for example, from a CD player to a Mini Disc recorder, from the Mini Disc player to a cassette tape recorder, from a cassette tape player to a Mini Disc recorder as well as from a CD player to a cassette tape recorder). When information is dubbed among various units, if dedicated operation buttons are used as with the conventional method, operation buttons corresponding to the combination of the units are required. Thus, there are problems about the cost, the allocation of the buttons, and the operations thereof.

OBJECTS AND SUMMARY OF THE INVENTION

An object of the present invention is to provide a synchronous dubbing system that allows a synchronous dubbing operation with any combination to be easily performed in a system composed of a variety of audio units.

To solve the above-described problem, the present invention is a synchronous dubbing system for dubbing data between any one of a plurality of playback units and any one of a plurality of record units, comprising a connector for selecting one of the output signals of the playback units and connecting the selected output signal to input terminals of at least two record units, a controller for controlling the connector, a bus line for sending a control signal among the playback units and the record units, the control signal being composed of category data and a command signal, a playback pause operation key for causing the selected playback unit to be placed in a playback pause state, a record pause operation key for causing the selected record unit to be placed in a record pause state, a record pause release operation key for causing the selected record unit to be released from the record pause state, and a control signal generator for generating a control signal composed of category data that represents all units connected to the bus line and a command signal for causing the units to be released from the playback pause state when the record pause release operation key is operated in the record pause state of the selected record unit and in the playback pause state of the selected playback unit.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 3 is a block diagram showing the relation of connections of the synchronous dubbing system according to the present invention;

DETAILED DESCRIPTION OF THE PREFERRED EMBODIMENT

Figure 1A:
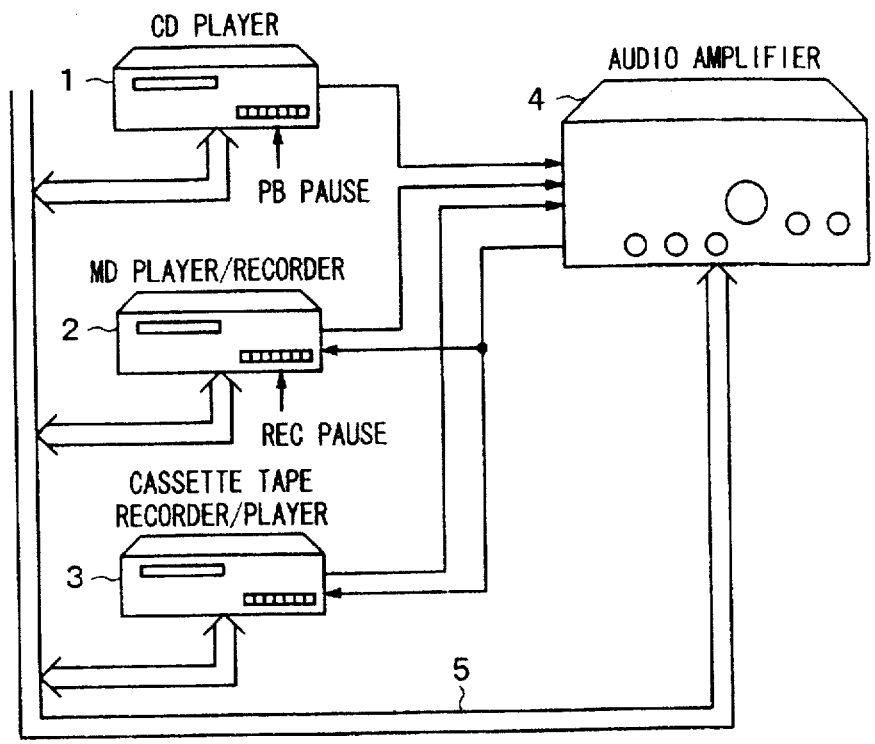
FIG. 1A is an overall diagram for explaining a record/playback pause control of a synchronous dubbing system according to the present invention.
Figure 1B:
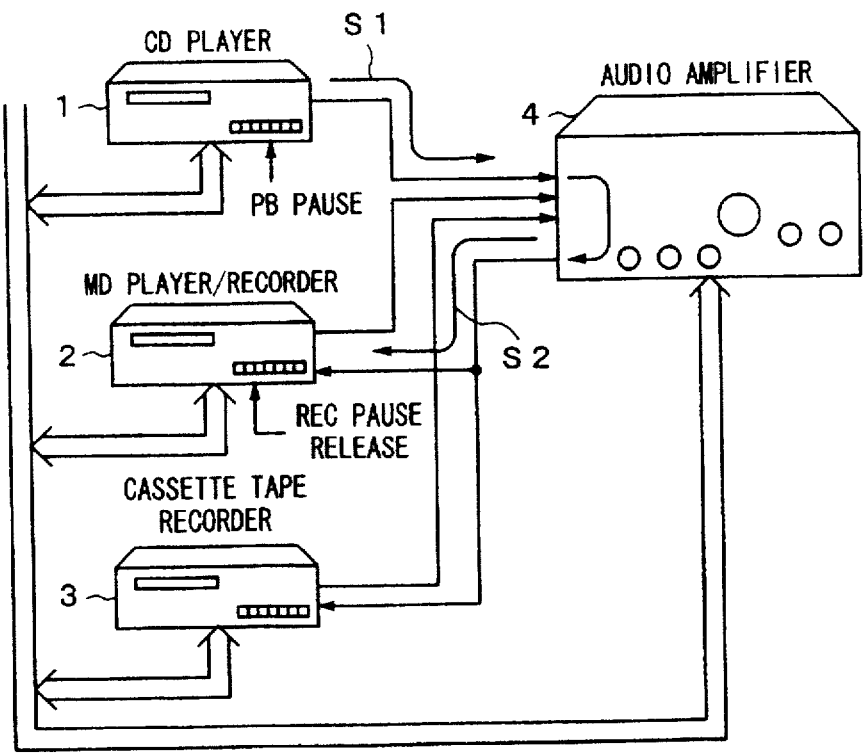
FIG. 1B is an overall diagram for explaining a record pause state release control of the synchronous dubbing system according to the present invention.

Next, with reference to the accompanying drawings, an embodiment of the present invention will be described. FIGS. 1A and 1B show an example of an audio system according to the present invention. In FIG. 1A, reference numeral 1 is a CD player. Reference numeral 2 is an MD player/recorder. Reference numeral 3 is a cassette tape player/recorder. Reference numeral 4 is an audio amplifier. The CD player 1, the MD player/recorder 2, the cassette tape recorder/player 3, and the audio amplifier 4 are connected to a bus 5. The CD player 1 is a playback only audio unit. On the other hand, the MD player/recorder 2 and the cassette tape player/recorder 3 are record/playback audio units.

Output terminals of the CD player 1, the MD player 2, and the cassette tape recorder 3 are connected to relevant input terminals of the audio amplifier 4. An output terminal of the audio amplifier 4 is connected to input terminals of the MD player 2 and the cassette tape recorder 3. The audio amplifier 4 functions as a selector that selects a desired one of outputs of the CD player 1, the MD player/recorder 2, and the cassette tape player/recorder 3. When information is dubbed, the audio amplifier 4 selects a desired playback unit from the CD player 1, the MD player/recorder 2, and the cassette tape player/recorder 3 and supplies a playback output of the selected unit to the MD player/recorder 2 or the cassette tape player/recorder 3 as a record unit.

Figure 2:
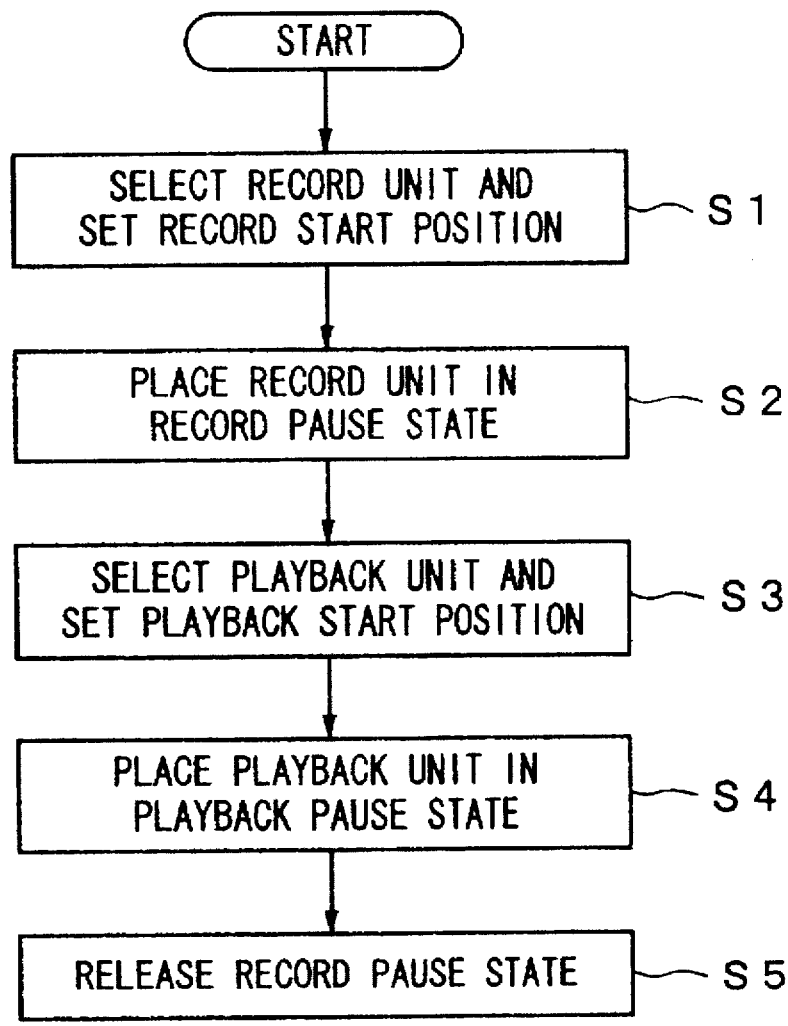
FIG. 2 is a flow chart showing a control sequence of a synchronous dubbing.
Figure 4:
FIG. 4 is a schematic diagram showing the format of a control signal transmitted through a bus line.

In the system according to the present invention, a synchronous dubbing operation can be performed between any two selected units of the CD player 1, the MD player/recorder 2, and the cassette tape player/recorder 3. FIG. 2 is a flow chart showing the user's operation procedure for the synchronous dubbing operation in the system.

The user selects a record unit and sets a desired record start position of a record medium loaded in the selected record unit (at step S1). The user places the record unit in the record pause state at the record start position (at step S2). When the user selects the MD player/recorder 2 as the record unit, he or she places the MD player/recorder 2 in the record pause state at the record start position. Thereafter, the user selects a playback unit and sets a desired playback start position of a record medium loaded in the selected playback unit (at step S3). Next, the user places the playback unit in the playback pause state at the playback start position (at step S4). When the user selects the CD player 1 as the playback unit, he or she places the CD player 1 in the playback pause state at the start position of a desired program.

Thereafter, the user releases the record pause state of the selected record unit with the pause release key. Thus, the record pause state of the record unit is released. The recording operation of the record unit is started. With a delay for which the record unit takes the record preparation, the playback pause state of the playback unit is automatically released. Thus, the playback operation of the selected playback unit is started. In addition, the selector of the audio amplifier 4 is automatically switched to the desired record unit. Thus, the synchronous dubbing operation is performed between any selected units.

FIG. 1B shows the case that the synchronous dubbing operation is performed with the CD player 1 and the MD player/recorder 2 selected as the playback unit and the record unit, respectively. For example, as shown in FIG. 1, the MD player/recorder 2 as the record unit is placed in the record pause state. In addition, the CD player 1 as the playback unit is placed in the playback pause state. Thereafter, as shown in FIG. 1A, the record pause state of the MD player/recorder 2 as the record unit is released. Thus, the record pause state of the MD player/recorder 2 as the record unit is released by a user's input. The recording operation of the MD player/recorder 2 is started. With a small delay, the playback pause state of the CD player 1 as the playback unit is automatically released. The playback operation of the CD player is started. In addition, the selector of the audio amplifier 4 is automatically switched to the CD player 1 side. Thus, the playback output S1 of the CD player 1 is supplied to the MD player/recorder 2 and recorded by the MD player/recorder 2.

In the system according to the present invention, the synchronous dubbing operation can be performed with any playback unit and any record unit selected. Next, a real synchronous dubbing operation will be described in detail.

As shown in FIG. 3, the CD player 1, the MD player/recorder 2, the cassette tape player/recorder 3, and the audio amplifier 4 have system controllers 11, 12, 13, and 14, respectively. These system controllers 11, 12, 13, and 14 are connected through the bus 5. Data is exchanged among the controllers 11, 12, 13, and 14 of the CD player 1, the MD player/recorder 2, the cassette tape player/recorder 3, and the audio amplifier 4 through the bus 5. The data is composed of a category code and a command. The category code is composed of, for example, eight bits that represent the type of the unit such as a CD player, an MD player/recorder, a cassette tape player/recorder, and an amplifier. A particular category code represents all categories corresponding to all of the types of equipment.

The audio amplifier 4 has a source selector 15. The playback output of the CD player 1 is supplied to an input terminal AA of the source selector 15. A playback output of the MD player/recorder 2 is supplied to an input terminal BB of the source selector 15. A playback output of the cassette tape player/recorder 3 as the playback unit is supplied to an input terminal CC of the selector 15. An output of the source selector 15 is supplied to input terminals of the MD player 2 and the cassette tape player/recorder 3. The source selector 15 is controlled by the controller 14 of the audio amplifier 4.

Figure 5:
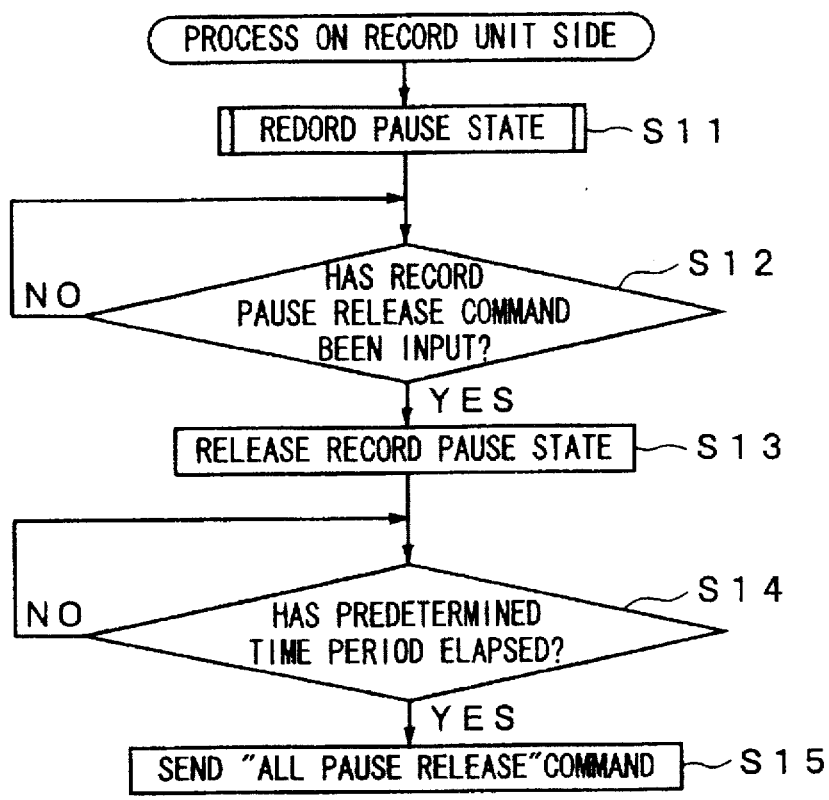
FIG. 5 is a flow chart showing a control on the record unit side in the case that a record pause state is released.

FIG. 5 is a flow chart showing the process of the record unit in the case that the synchronous dubbing operation is started. As shown in FIG. 5, in the record pause state (at step S11), the record unit determines whether or not a record pause release command has been input (at step S12). When the record pause release command has been input, the record unit releases the record pause state (at step S13). After a predetermined time period has elapsed (at step S14), the record unit sends "ALL PAUSE RELEASE" command (at step S15). The "ALL PAUSE RELEASE" command causes all the units to be released from the pause states. This command is sent with the category code "ALL" and the command "PAUSE RELEASE".

Figure 6:
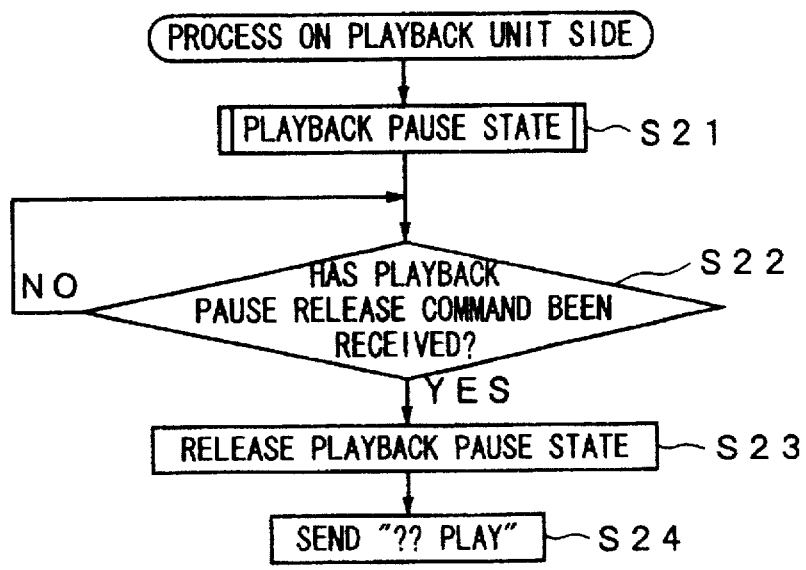
FIG. 6 is a flow chart showing a control on the playback unit side in the case that a playback pause state is released.

FIG. 6 is a flow chart showing the process of the playback unit in the case that the synchronous dubbing operation is started. In the playback pause state (at step S21), the playback unit determines whether or not "PAUSE RELEASE" command has been received (at step S22). When the "PAUSE RELEASE" command has been received, the playback unit releases the playback pause state (at step S23) and sends a "?? PLAY" command that represents that the playback pause state has been released. "??" is a category code of the unit of which the pause state has been released. Assuming that the category code of the CD player 1 is "AA", the category code of the MD player/recorder 2 is "BB", the category code of the cassette tape player/recorder 3 is "CC", when the playback operation of the CD player 1 is started, "AA PLAY" is sent. When the playback operation of the MD player/recorder 2 is started, "BB PLAY" is sent. When the playback operation of the cassette player/recorder 3 is started, "CC PLAY" is sent.

Figure 7:
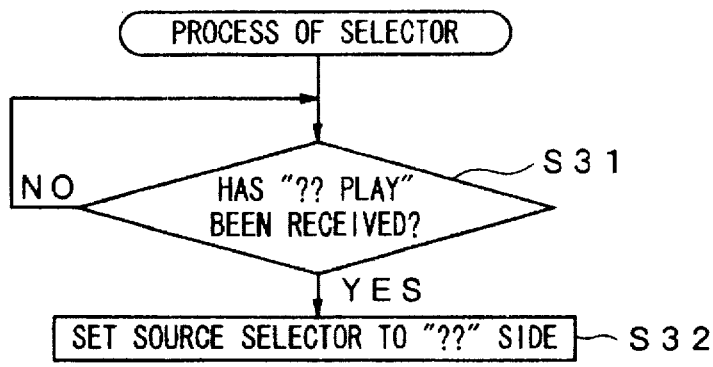
FIG. 7 is a flow chart showing a control on a selector side corresponding to a control signal received from the playback unit side through the bus line.

FIG. 7 is a flow chart showing the process of the selector (audio amplifier 4) in the case that the synchronous dubbing operation is started. The selector determines whether or not "?? PLAY" has been received (at step S31). When the "?? PLAY" has been received, the selector sets the source selector 15 to "??" side corresponding to the category code (at step S32). In other words, when the playback operation of the CD player 1 has been started and "AA PLAY" has been received, since the category code is "AA", the selector sets the source selector 15 to the "AA" side. When the playback operation of the MD player 1 has been started and "BB PLAY" has been received, since the category code is "BB", the selector sets the source selector 15 to the "BB" side. When the playback operation of the cassette tape recorder 3 has been started and "CC PLAY" has been received, since the category code is "CC", the selector side sets the source selector 15 to the "CC" side.

Figure 8:
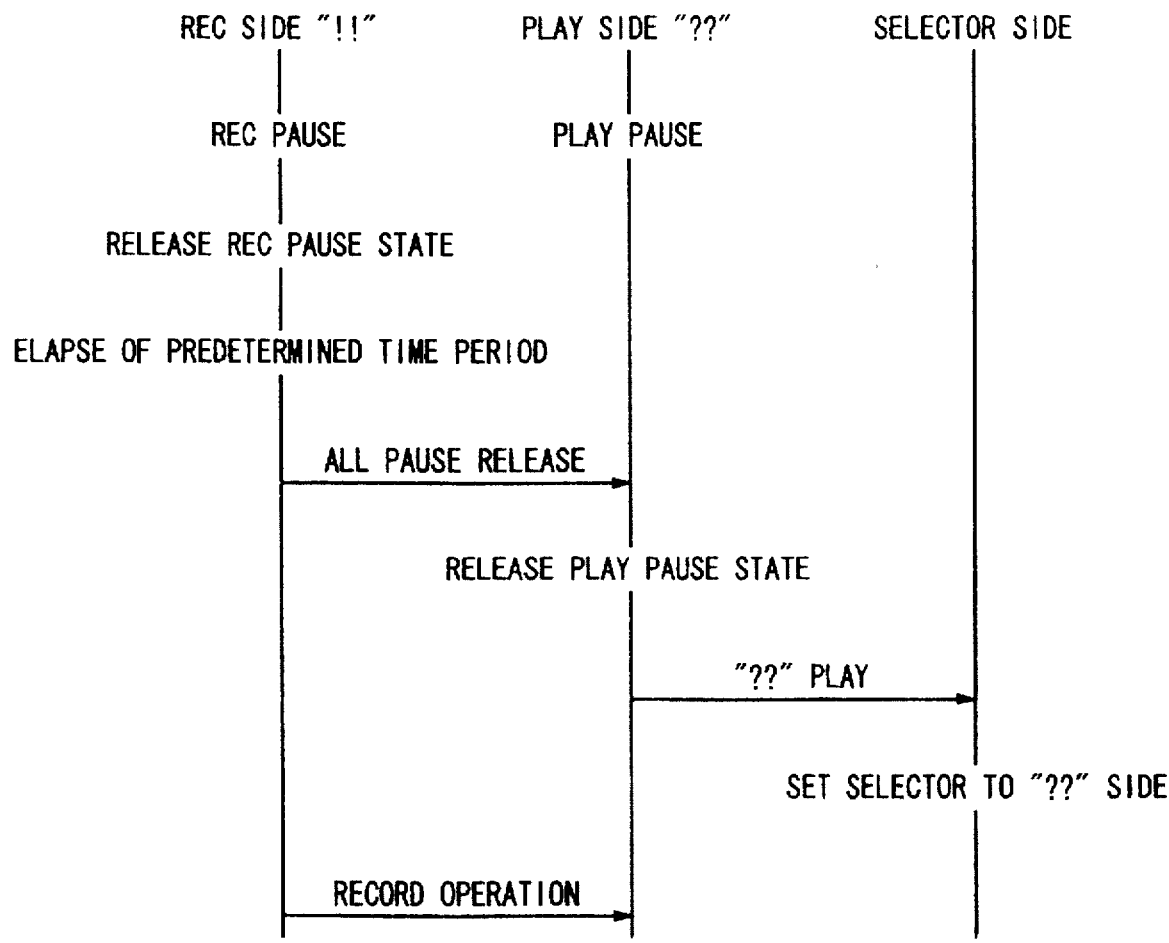
FIG. 8 is a transition diagram showing a control sequence of a record unit, a playback unit, and a selector in the case that the record pause is released.

In the system composed of the CD player 1, the MD player 2, the cassette tape recorder 3, and the audio amplifier 4, when these units are operated in the above-described process, the synchronous dubbing operation can be performed between any units. FIG. 8 shows the process in which the synchronous dubbing operation is started.

As shown in FIG. 8, when the synchronous dubbing operation is started, the record unit is placed in the record pause state and the playback unit is placed in the playback pause state. Thereafter, the record pause state of the record unit is released. When the record pause state of the record unit is released, after an elapse of a predetermined time period, an "ALL PAUSE RELEASE" command is output from the record unit. The "ALL PAUSE RELEASE" command releases the playback pause state of the playback unit. When the playback pause state of the playback unit is released, "?? PLAY" is sent. "?? PLAY" is received by the selector. Corresponding to "?? PLAY", the source selector "??" is set to "??" side. Thus, the synchronous dubbing operation can be performed.

Figure 9:
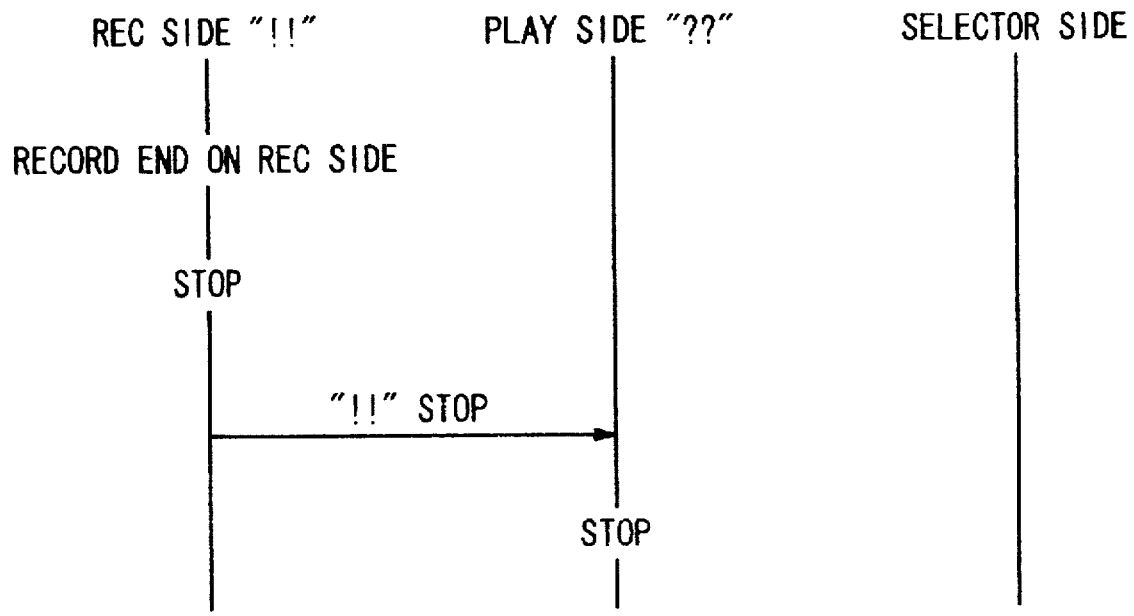
FIG. 9 is a transition diagram showing a control sequence of a record unit, a playback unit, and a selector in the case that the record operation is stopped.

FIG. 9 shows the process of the record unit in the case that the record end takes place. When the record unit comes to the record end, the record unit stops. At this point, "!! STOP" is sent. "!!" represents the category code of the record unit. When "!! STOP" is received by the playback unit, it is stopped. When the record unit comes to the record end, after "!! STOP" is sent from the record unit, the playback operation of the playback unit may be continued.

Figure 10:
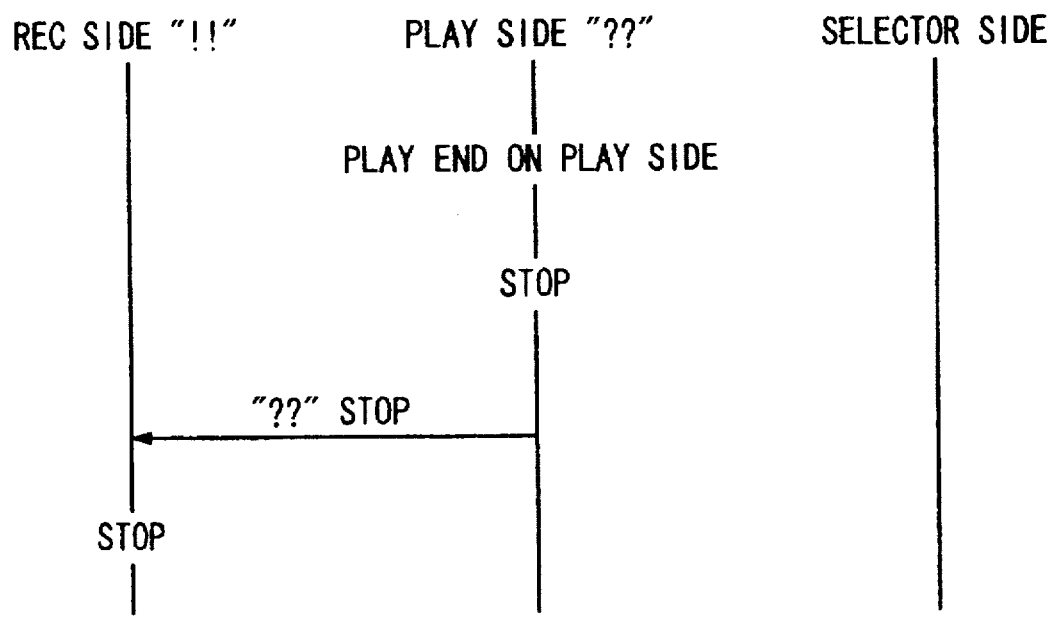
FIG. 10 is a transition diagram showing a control sequence of a record unit, a playback unit, and a selector in the case that the playback operation is stopped.

FIG. 10 shows the process of the playback unit in the case that the playback unit comes to the playback end. When the playback unit comes to the playback end, the playback unit is stopped. At this point, "?? STOP" is sent. "??" represents the category code of the playback unit. When "?? STOP" is received by the record unit, it is stopped.

According to the present invention, a playback unit and a record unit with which information is dubbed are selected. The playback unit is placed in the playback pause state. In addition, the record unit is placed in the record pause state. Thereafter, the record pause state of the record unit is released. Thus, the playback pause state of the playback unit is automatically released. In addition, the selector is automatically switched to the desired playback unit. Thus, the synchronous dubbing operation is started. Consequently, in the system composed of a plurality of audio units such as a CD player, an MD player/recorder, and a cassette tape player/recorder, the synchronous dubbing operation can be performed between any two units.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A synchronous dubbing system for dubbing data between any one of a plurality of playback units and any one of a plurality of record units, comprising:

connection means for selecting one output signal from the plurality of playback units and connecting the selected one output signal to input terminals of at least two of said plurality of record units;

control means for controlling the selecting operation of the connection means;

a bus line for sending a control signal among the plurality of playback units and the plurality of record units, the control signal being composed of category data and a command signal;

playback pause state set means for causing the selected one of the plurality of playback units to be placed in a playback pause state;

record pause state set means for causing a selected one of the at least two record units to be placed in a record pause state; and record pause state release means for causing the selected one of the at least two record units to be released from the record pause state; and control signal generation means for generating a control signal composed of category data that represents all of the plurality of playback units and record units connected to the bus line and a command signal for causing the selected one of the plurality of playback units to be released from the playback pause state when the record pause state release means is operated in the selected record unit.

2. The synchronous dubbing system as set forth in claim 1, wherein the control signal generated by the control signal generation means is received by said plurality of playback units and record units through the bus line, whereby the playback pause state of any playback unit is released corresponding to the received control signal.

3. They synchronous dubbing system as set forth in claim 1, wherein the control signal generation mans includes means for generating the control signal following a lapse of a predetermined time period after the record pause state release means is operated.

4. The synchronous dubbing system as set forth in claim 1, wherein after the playback pause state of any playback unit of the plurality of playback units is released in response to the control signal received through the bus line, the playback unit generates a respective category code and a respective operation state for placing on the bus line.

5. The synchronous dubbing system as set forth in claim 4, wherein the connection means is controlled in response to the category code and the operation state supplied from the playback unit through the bus line.

6. The synchronous dubbing system as set forth in claim 1, wherein any playback unit of the plurality of playback units generates a command signal that represents a respective category code and a respective stop operation state in response to to operation of a stop button.

7. The synchronous dubbing system as set forth in claim 1, wherein any record unit of the plurality of record units generates a command signal that represents a respective category code and a respective stop state in response to operation of a stop button.

8. A synchronous dubbing method for dubbing data between any one of a plurality of record units and any one of a plurality of playback units, comprising the steps of:

sending a command for causing all the playback units connected to a record unit through a bus line to be released from a playback pause state when a record pause state of the record unit is released; and sending through the bus line a category state and a status of each of the playback units whose playback pause state has been released in response to the command.

* * * * *